United States Patent [19]

Voigt

[11] 4,282,567

[45] Aug. 4, 1981

[54] MODIFIED POWER TRANSFORMER FOR SELF-OSCILLATING CONVERTER REGULATOR POWER SUPPLY

[75] Inventor: William C. Voigt, Houston, Tex.

[73] Assignee: Texas Instruments Incorporated, Dallas, Tex.

[21] Appl. No.: 920,106

[22] Filed: Jun. 28, 1976

Related U.S. Application Data

[63] Continuation of Ser. No. 735,341, Oct. 26, 1976, abandoned.

[51] Int. Cl.[3] .................... H02P 13/18; H01F 17/04

[52] U.S. Cl. .................... 363/15; 336/83; 336/178; 363/21

[58] Field of Search .................... 336/165, 178, 83; 363/18, 19, 15, 21; 331/113 A

[56] References Cited

U.S. PATENT DOCUMENTS

| | | | |
|---|---|---|---|
| 1,132,016 | 3/1915 | Jobke | 336/178 X |
| 1,353,711 | 9/1920 | Bergman | 336/165 X |
| 2,025,093 | 12/1935 | Cotter et al. | 336/178 X |
| 2,852,730 | 9/1958 | Magnuski | 331/113 A |
| 3,112,439 | 11/1963 | Rosin | 336/165 X |
| 3,546,571 | 12/1970 | Fletcher | 336/165 X |
| 3,603,864 | 9/1971 | Thaler | 336/178 X |
| 3,809,994 | 5/1974 | Enni | 363/18 |

FOREIGN PATENT DOCUMENTS

| | | | |
|---|---|---|---|
| 4741687 | 12/1968 | Japan | 336/178 |
| 1027685 | 4/1966 | United Kingdom | 336/178 |

*Primary Examiner*—Thomas J. Kozma
*Attorney, Agent, or Firm*—Thomas G. Devine; N. Rhys Merrett; Melvin Sharp

[57] ABSTRACT

The ferromagnetic core of a transformer in a switching regulator power supply is configured to improve the efficiency of the supply. Since the switching times and their resultant losses occupy a greater percentage of the energy-storage energy-transfer cycle as the operating frequency increases, efficiency is increased by narrowing the operating frequency range. There is provided a transformer core which allows the inductances in the transformer windings to vary during each energy-storage and energy-transfer half cycle. The initial inductance can be chosen such that a predetermined time interval is added to each half cycle regardless of output load to thereby decrease the operating frequency range.

3 Claims, 10 Drawing Figures

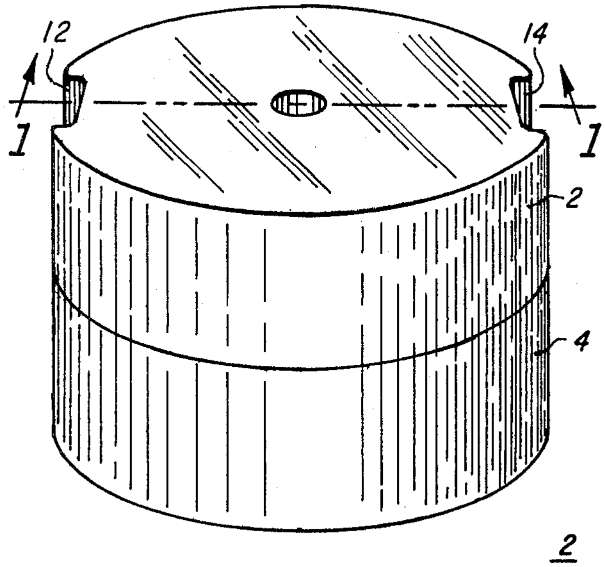
Fig. 2
Fig. 3a
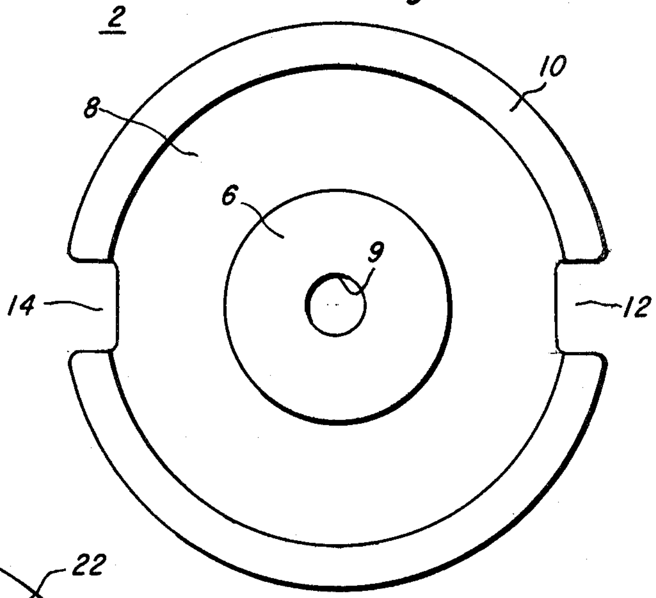
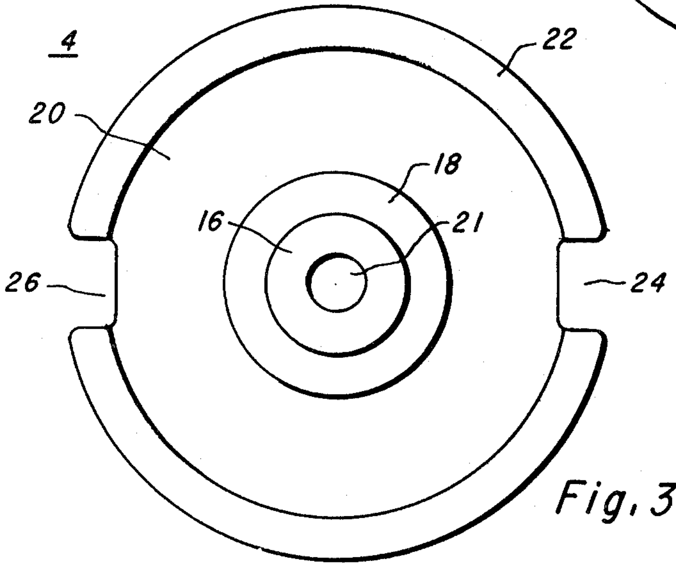
Fig. 3b

Fig. 4
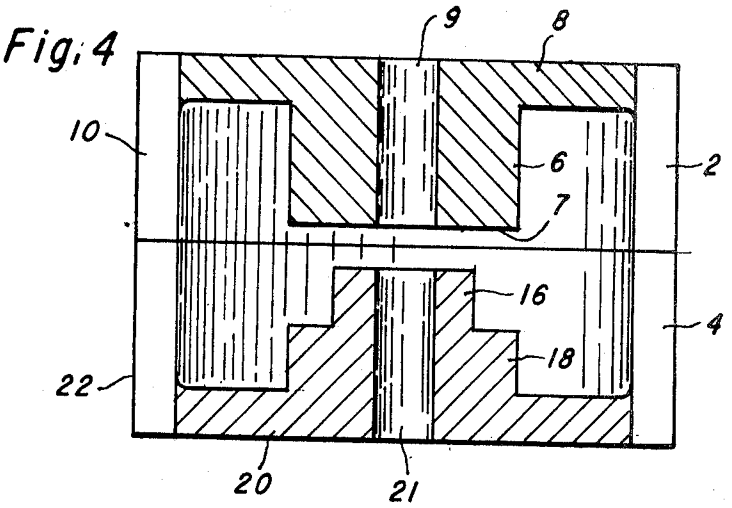
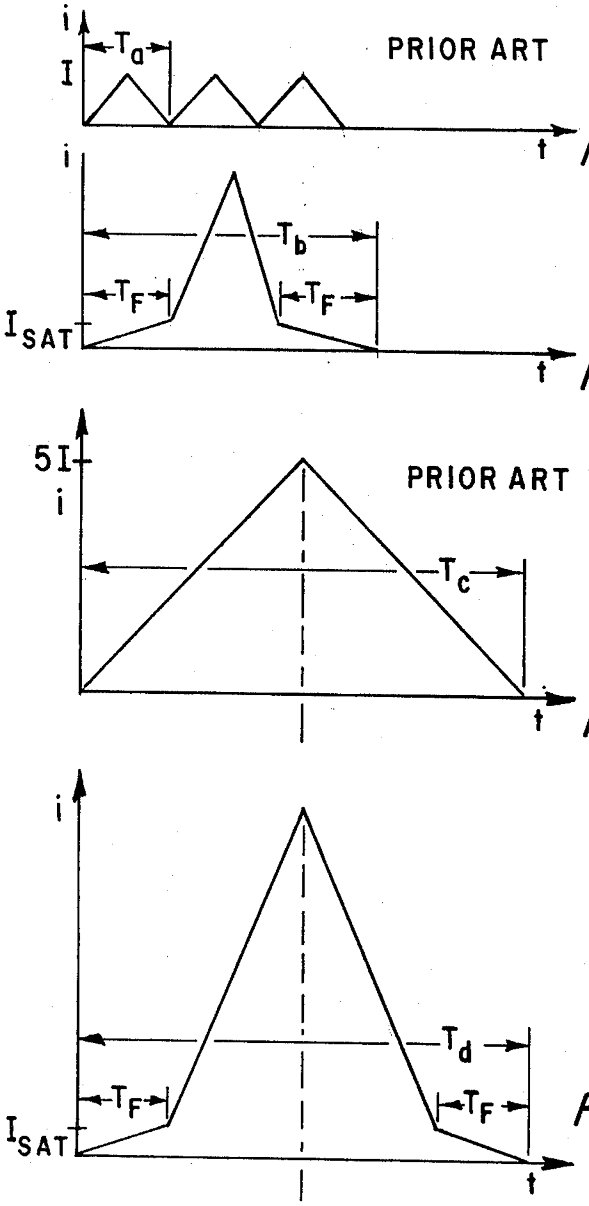
Fig. 5a
Fig. 5b
Fig. 5c
Fig. 5d

MODIFIED POWER TRANSFORMER FOR SELF-OSCILLATING CONVERTER REGULATOR POWER SUPPLY

This is a continuation of application Ser. No. 735,341, filed Oct. 26, 1976, now abandoned.

BACKGROUND OF THE INVENTION

1. Field of the Invention

This invention relates to power supplies and in particular to self oscillating switching regulator power supplies.

2. Description of the Prior Art

Switching regulator power supplies employ a transformer for cyclically storing energy in its magnetic field during an energy storage cycle and then transferring the energy stored in the magnetic field to secondary windings during an energy transfer cycle. Self-oscillating switching regulator power supplies such as that disclosed and claimed in U.S. Pat. No. 3,889,173 operate over a wide frequency range because the frequency varies approximately inversely with the load. Since the time required for switching is finite, the switching time occupies a greater percentage of the duty cycle as the frequency increases with a resultant loss of efficiency.

It is desirable to increase the period of each switching cycle. However, the frequency must always be high enough to avoid audible noise. Therefore, in order to maximize efficiency, it is desirable to have the switching regulator operating frequency approximately constant above the audible frequency range. Driven regulator power supplies such as the clock controlled regulator disclosed in copending U.S. Patent Application, Ser. No. 502,703, now abandoned entitled "Switching Regulator Power Supply" and assigned to the assignee of this invention, have achieved this. The transformer of this invention makes possible a switching regulator power supply that does not have to rely on a separate clock to operate continuously above the audible range of frequencies.

SUMMARY OF THE INVENTION

The present invention provides a modified ferromagnetic transformer core to be used in self-oscillating switching regulator power supplies. The present invention permits substantial reduction in the operating frequency range of the power supply and thereby improves efficiency with no additional components of circuitry.

Greater efficiency is provided by allowing the incremental inductance of the primary winding to vary during the duty cycle rather than having a relatively constant inductance. In accordance with this invention, there is provided a ferromagnetic transformer core with a "stepped" gap. That is, the gap is not uniform. This allows a part of the transformer's magnetic path to saturate at a relatively low current level in the windings. Any further increase in current is faced with a lower primary winding inductance due to saturation in part of the core. Therefore, the stepped gap core is designated to insure saturation at a predetermined current level which is below the smallest peak current. The peak current is smallest at the highest operating frequency.

The overall gap is reduced to give a higher presaturation inductance. Since the rate of rise of power transistor current during the energy storage cycle and the rate of fall of the rectified load currents during the energy transfer cycle are inversely proportional to the transformer primary inductance, a fixed time interval is inserted into each cycle at the beginning and end of each cycle. That fixed time interval is equal to the rise time of the current to the predetermined level (at which saturation occurs) with the initial presaturation inductance. With that time interval added to the beginning and end of each cycle regardless of load, the frequency range is thereby decreased. The switching times occupy a smaller percentage of the cycle and efficiency is thereby increased.

BRIEF DESCRIPTION OF THE DRAWINGS

For a more complete understanding of the invention and for further objects and advantages thereof, reference may now be had to the following description taken in conjunction with accompanying drawings in which:

FIG. 2 is an isometric view of an assembled ferrite core;

FIG. 3*a* is an inside view of the top half of the ferrite core;

FIG. 3*b* is an inside view of the bottom half of the ferrite core;

FIG. 4 is a sectional view at line 11 in FIG. 2 of the ferrite core;

FIGS. 5*a*–*d* illustrate comparative transformer operation.

DETAILED DESCRIPTION OF THE PREFERRED EMBODIMENT

The preferred embodiment of this invention is a self-oscillating switching regulator power supply which includes a transformer having a ferrite core with a portion of the core removed to produce a stepped air gap.

Figure 1A:
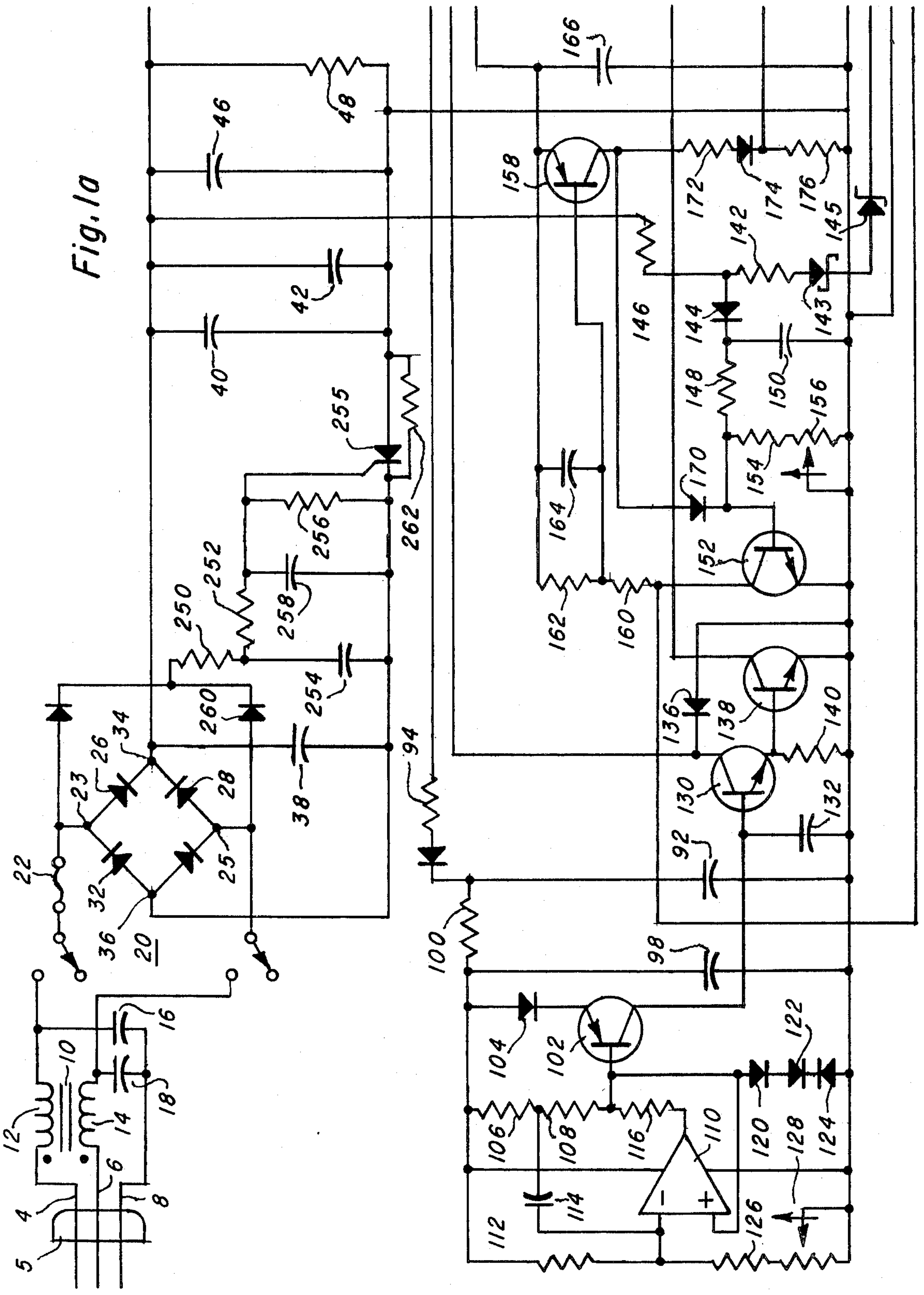
FIGS. 1*a*–*b* are a schematic of a self-oscillating switching regulator power supply.
Figure 1B:
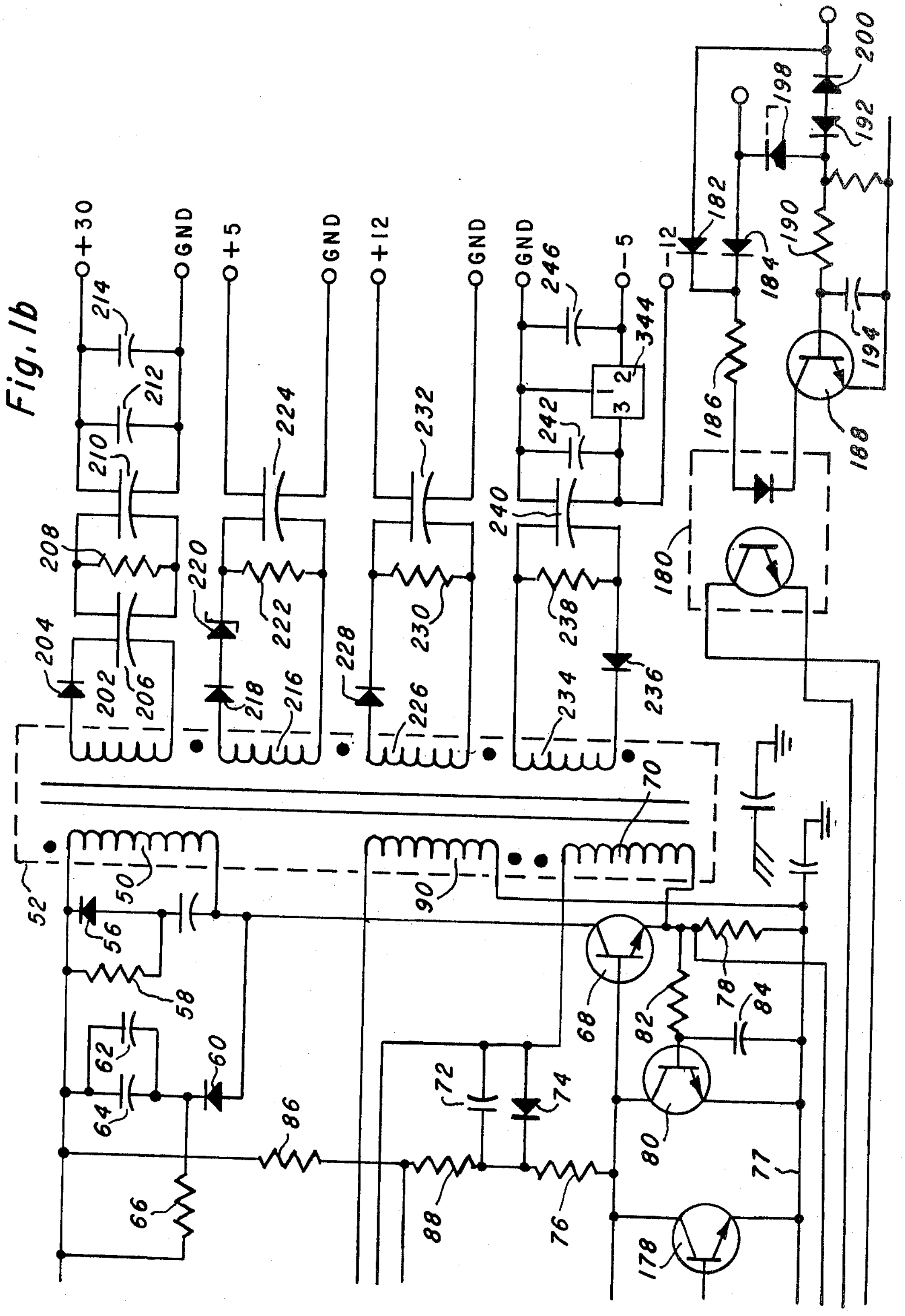

Referring to FIG. 1, a self-oscillating switching regulator power supply is illustrated, which is explained in detail in a copending U.S. patent application, Ser. No. 726,375 now U.S. Pat. No. 4,092,709 entitled "Multiple Output Self Oscillating Converter Regulator Power Supply" and which is incorporated herein by reference. The power supply operates on an energy-storage, energy-transfer cycle. Energy is stored in the magnetic field of primary winding 50 of transformer 52 as current begins to flow through winding 50 and switching transistor 68. When transistor 68 switches off, the primary current is interrupted, and the stored energy is transferred through the secondary winding 202, 216, 226, 234 and 90 to their associated circuits. Transformer 52 has a ferrite core.

Referring now to FIGS. 2, 3 and 4, the ferrite core is comprised of core halves 2 and 4. Core half 2 is comprised of annular ring 8 which forms the base. Cylindrical mesa 6 is axially disposed on base 8 containing cylindrical aperture 9 which passes axially through mesa 6 and base 8. The top of mesa 6, together with aperture 9, define face 7 of mesa 6. Outer wall 10 surrounds base 8 and has diametrically opposed slots 12 and 14.

Core half 4 is comprised of a circular base 20. Cylindrical mesa 18 is axially positioned on base 20 with cylindrical mesa 16 positioned on top of mesa 18 such that the top plane of mesa 16 is positioned above the top plane of mesa 18 which in turn is positioned above the top plane of base 20. Outer wall 22 surrounds base 20 and when in position with core half 2 abuts outer wall 10, providing a gap between face 7 of mesa 6 and the plane top of mesa 16 as well as a gap formed by face 7 and the plane top of mesa 18. Outer wall 22 has diametrically opposed slots 24 and 26. The transformer windings are wound in the cylindrical space defined by outer walls 10 and 22, bases 8 and 20, and mesas 6 and 18. The lead wires to the transformer windings are passed through slots 12, 14, 24, and 26 in the outer walls 10 and 22 respectively.

In operation, the flux produced by current in the coils passes through the core section along the path of least reluctance. As can be seen in FIG. 4, mesa 16 (with the corresponding portion of mesa 6 above it) will be the path of least reluctance since the gap between core halves is smallest at that point. The winding inductance will then be primarily a function of the gap between mesas 16 and 6. This path will saturate at a relatively low current ($I_{SAT}$) because of the reduced cross sectional area of mesa 16. At saturation, this narrow core section will effectively disappear from the magnetic circuit which increases the core reluctance, thereby decreasing the winding inductance at saturation to a value determined by the gap between mesa 18 and mesa 6.

Transformer operation can be seen in FIG. 5. The first half of each cycle illustrated is the power transistor 68 collector current during energy storage and the second half is the total load current in the secondary windings of transformer 52 during energy transfer, normalized where the number of turns in the primary and secondary windings differ. FIGS. 5*a* and 5*c* show transformer operation with the constant inductance $L_c$ (prior art transformer operation) at two values of peak load current, I and 5I, respectively. The slope of the waveforms is inversely proportional to $L_c$. FIGS. 5*b* and 5*d* illustrate transformer operation employing the present invention.

In a preferred embodiment of the invention, the gap between mesas 6 and 16 is made sufficiently narrow so that $L_1=4L_c$.

$L_1$ is the initial (presaturation) winding inductance for a transformer employing the modified core. Since the current slopes are inversely proportional to their respective winding inductances, the initial slopes of the waveforms in FIGS. 5*b* and 5*d* are smaller by a factor of 4 than the slopes in FIGS. 5*a* and 5*c*. Since saturation occurs at the same flux density (produced by current ISAT) regardless of load, a fixed time interval $T_f$ is added to each half cycle.

To compute the post saturation inductance $L_2$, the period $T_c$ can be taken as the maximum allowed to avoid audible noise. Therefore, $T_d$ can be no greater than $T_c$ and thus the two time are equal:

$$T_c=T_d$$

The average currents in FIGS. 5*c* and 5*d* must be the same for the power output to be the same, as must the average currents in FIGS. 5*c* and 5*b*. Thus:

$$\frac{1}{T_{c/2}}\int_0^{T_{c/2}}\frac{k}{L_c}-t\,dt=$$

-continued $$\frac{1}{T_{d/2}}\left[\int_0^{T_f}\frac{kt}{L_1}dt+\int_{T_f}^{T_{d/2}}\left(\frac{kt}{L_2}+b\right)dt\right]$$

where k is the constant of proportionality between the slopes of the waveforms and the inductance and where $$b=I_{SAT}-\frac{kT_f}{L_2}\text{ and }I_{SAT}=\frac{kT_f}{L_1}$$

Substituting the beforementioned equalities and solving the integrals, yields:

$$L_2\text{ (post-saturation inductance)}=3/7\ L_c$$

Similarly, the average currents in FIG. 5*a* and FIG. 5*b* must be the same. Therefore:

$$\frac{1}{T_{a/2}}\int_0^{T_{a/2}}\frac{k}{L_c}t\,dt=\frac{1}{T_{b/2}}\left[\int_0^{T_f}\frac{kt}{L_1}dt+\int_{T_f}^{T_{b/2}}\left(\frac{kt}{L_2}+b\right)dt\right]$$

yielding:

$$T_b=3.3\ T_a$$

The ratio of $T_c$ to $T_a$ is 5 compared to a ratio of less than 2 for $T_2$ to $T_b$. Thus the frequency range has been substantially reduced by increasing the period of the higher frequencies while maintaining the low frequencies above the minimum required.

What is claimed is:

1. In a self-oscillating switching regulator power supply of the type wherein an improved transformer alternately stores energy in a primary winding and then transfers energy into at least one secondary winding, the improved transformer having a ferromagnetic core comprising:

(a) a first ferromagnetic mass having a first face comprising a mesa; and (b) a second ferromagnetic mass having a second face comprising a second mesa, the second face having a varied contour comprising a third mesa axially disposed on the second mesa, the first and second faces juxtaposed to provide an effective air gap therebetween, whereby a magnetic path passing through the core provides successive saturation varying inductance automatically in dependence on the current level in the windings and the contour of the second face, effectively limiting the frequency range.

2. The combination set forth in claim 1 wherein the first face comprises a planar area.

3. The combination set forth in claim 2 wherein the second face comprises a first and second planar area, the first planar area being raised above the second planar area.

* * * * *